United States Patent [19]

Brehon

[11] 4,417,593
[45] Nov. 29, 1983

[54] HAND PORTABLE GRAIN THRESHING APPARATUS

[76] Inventor: Garth A. Brehon, 7-1216 Morgan Ave., Saskatoon, Saskatchewn, Canada, S7H 2R7

[21] Appl. No.: 360,188

[22] Filed: Mar. 22, 1982

[30] Foreign Application Priority Data

Nov. 25, 1981 [CA] Canada .................................. 390885

[51] Int. Cl.³ .......................... A01F 5/00; A01F 12/48
[52] U.S. Cl. .............................. 130/27 HF; 130/30 R; 130/30 H; 241/169.1
[58] Field of Search ............. 130/27 HF, 27 M, 30 H, 130/30 R; 241/169.1

[56] References Cited

U.S. PATENT DOCUMENTS

| | | | |
|---|---|---|---|
| 739,908 | 9/1903 | Nightingale | 130/27 M |
| 1,910,357 | 5/1933 | Nye | 130/27 M |
| 2,399,718 | 5/1946 | Baker et al. | 130/30 R |

FOREIGN PATENT DOCUMENTS

| | | | |
|---|---|---|---|
| 29627 | 4/1931 | Australia | 130/27 HF |
| 129581 | 4/1947 | Australia | 130/30H |
| 1230810 | 9/1960 | France | 130/27 M |

*Primary Examiner*—Paul J. Hirsch
*Attorney, Agent, or Firm*—Stanley E. Johnson; Richard J. Hicks

[57] ABSTRACT

A portable hand carryable device for threshing a sample of grain and separating the kernels of grain from the chaff which inclues two separate chambers one having a beater therein for threshing the grain and the other a fan for causing air to flow through an open ended column. The beater and fan are driven preferably by a 12 volt electric motor. Each chamber has an inlet thereto and an outlet therefrom, said outlets being connected by suitable conduit means to the air column between the opposite open ends thereof. During operation the column slopes upwardly from one end to the other and air flow from the fan is directed so as to flow in a direction from the lower to the upper end of the column past a passage connecting the outlet of the beater chamber to such column. The beater is preferably a two prong rotor circumscribed by a cylindrical in form foraminous wall made of expanded metal lath.

14 Claims, 3 Drawing Figures

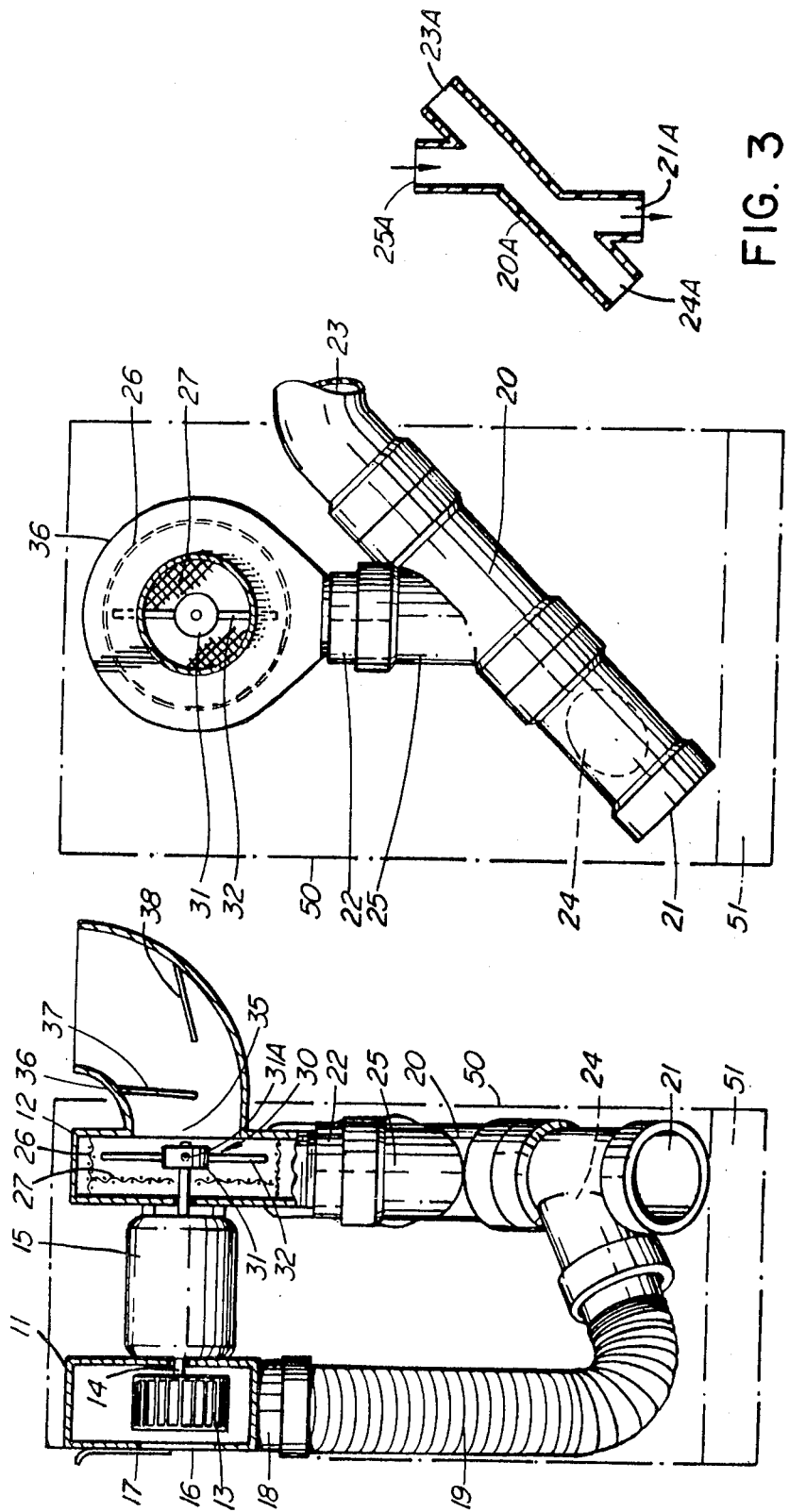

HAND PORTABLE GRAIN THRESHING APPARATUS

This invention relates to a portable hand carried apparatus for threshing wheat, oats, barley or the like, to obtain a threshed sample of grain for purposes of conducting a moisture test.

BACKGROUND OF THE INVENTION

In farming operations it is often desirable to obtain a sample from a standing crop (or one which has been swathed) before determining whether or not conditions are suitable for combining and the most important feature is whether or not the moisture content of the grain is below an acceptable level for harvesting. In the past, farmers have normally rubbed out a sample by hand and this is extremely laborious and time consuming and furthermore not necessarily accurate as to moisture content because of body heat and moisture of the person doing the sampling. An alternative to the foregoing is to take a full size combine to the field, thresh a portion of the grain and retrieve a sample from the hopper. This is time consuming as well as expensive and difficult and wasteful in that perhaps more is collected than required. In large scale farming operations the crop to be harvested is also in many instances quite some distance from the buildings where the combines are kept.

A state of the art search has failed to reveal any equivalent machines for Applicant's intended purpose. However, in the very early development of threshing devices some were portable and as examples of such, attention is directed to: Canadian Pat. Nos. 177,675-issued June 19, 1917; 287,459-issued Feb. 26, 1929; and 316,060-issued Oct. 13, 1931.

The foregoing disclosed devices, while portable, do not have the required portability for sampling, and were intended for threshing complete crops.

A principal object of the present invention is to provide a machine designed to thresh enough grain for a moisture test, be totally portable and capable of being carried by hand and have enough capacity to thresh a sample of grain, as well as separate the kernels from chaff.

SUMMARY OF THE INVENTION

In accordance with the present invention there is provided a simple portable hand carryable power driven device for threshing samples of grain and separating the kernels of grain from the chaff.

More particularly there is provided in accordance with the present invention a device that can be hand carried and including a chamber having a beater assembly therein for disintegrating material fed thereto. A foraminous wall is located behind the beater and also around the periphery of the beater, such walls being spaced from the walls of the chamber. Chaff and kernels of grain pass through the foraminous wall and flow downwardly into a column through which air is caused to flow. The column is provided with a pair of outlets, one being at a lower elevation than the other. Air flow in the column is in the direction from the lower outlet toward the upper outlet. The air flow is such as to allow the kernels to flow downwardly, countercurrent to the air flow, toward the lower outlet and the chaff is carried by the airflow to the higher of the two outlets and is discharged therefrom. Motor means is provided for driving the disintegrator and also to cause air flow through the column.

BRIEF DESCRIPTION OF THE DRAWINGS

The present invention is illustrated by way of example in the accompanying drawings wherein:

FIG. 1 is a side elevational view of a threshing unit constructed in accordance with the present invention;

FIG. 2 is a partial right-hand elevational view of FIG. 1; and,

FIG. 3 is a partial view of an alternative air column for the device illustrated in FIGS. 1 and 2.

DETAILED DESCRIPTION OF THE PREFERRED EMBODIMENT

Referring to the drawings there is illustrated a portable hand carried threshing device having first and second chambers 11 and 12 separated from one another and providing respectively means for causing an air flow and disintegrating material to be tested. Chamber 11 has a fan 13 mounted therein and attached to the shaft 14 of a 12-volt DC electric motor 15. Chamber 11 has an air inlet 16 with a movable plate 17 secured to the casing to vary the size of the inlet and thereby provide means for adjusting the amount of air flow provided by the fan. The housing or chamber 11 has an outlet 18 connected by way of a conduit 19 to a column or further conduit 20. The column or conduit 20 has an open lower outlet 21 below an inlet 24 to the column and to which conduit 19 is attached for directing air from the fan into the column so as to flow vertically upwardly therethrough. Chamber 12 is connected to column 20 by way of a vertical conduit 22, upstream from the air inlet 24 and downstream from a column discharge outlet 23.

As will be apparent from FIG. 2, column 20 slopes upwardly from the lower outlet 21 to the upper outlet 23, the slope being about 45° relative to a horizontal plane. Also, it will be noted conduit 19 is connected to column 20 by way of an angled coupling which is arranged at an angle of approximately 45° to the axis of the column. Conduit 22 is vertical and thus also is at approximately 45° relative to the axis of column 20. Conduit 22 is connected to column 20 at an inlet 25 such inlet being radially offset from air inlet 24 by an angle of approximately 45°.

The chamber 12 (provided by any suitable housing) has a first annular screen 26 disposed therein and spaced from the side wall of the housing and a circular screen 27 spaced from one of the vertical side walls of the housing. The screens are expanded metal lath or other similar foraminous wall.

The motor 15 is a double-ended shaft-type mounted between the respective chambers 11 and 12 and a beater 30 is mounted on the shaft in chamber 12 interiorly of the foraminous wall 26. The beater 30 consists of a hub 31 detachably anchored to the motor shaft 14 by a set screw 31A. One or more prongs 32 project radially outwardly from the shaft. Good threshing results have been obtained using only two fingers or prongs, and the threshing was about the same using three, but in the latter instance it was found more power was required to drive the beater. An inlet 25 is provided centered on the axis of rotation of the beater, for feeding material to the same. A curved conduit 36 can be provided for use in feeding material to the beater and to avoid rebound of kernels from the beater deflectors 37 and 38 may be incorporated in the passage if so desired.

Experiments conducted with various models, some with and some without screens (i.e., foraminous walls) 26 and 27, revealed that superior results were obtained when using such walls. Expanded metal lath was found quite satisfactory for both walls 26 and 27. In an actual device constructed, good results were obtained using a housing diameter of 16.5 cm, beater length of 11 cm surrounded by a 12 cm diameter concave 26. The rear screen or wall 27 of expanded metal lath was spaced 1.5 cm from the back of the housing leaving a 4 cm deep area for threshing. The feed inlet was 7.5 cm in diameter. The speed of the rotor at initial impact was 19.9 m/sec. and the top speed was 28.8 m/sec. It was found that by using the surrounding expanded metal wall 26 most of the material was impacted at least twice before leaving the threshing chamber. Experiments were conducted utilizing a two prong or two arm beater and a three arm beater and it was found there was little difference in threshing ability indicating the number of impacts per revolution was not a factor in threshing. However, the three arm rotor was found to require more driving power without any noticeable improvement in threshing. The positioning of the beater was modified during experimental tests and little difference was found irrespective of positioning. Good results, however, were found when the beater was spaced about 1 cm from the back screen, i.e., screen 27.

A multi-speed or variable motor is preferred, adapting the device for use with different grains. In initial tests, a two speed motor, operable at one or the other of 3,000 or 5,000 rpm was utilized and found satisfactory. With adjustability of the air intake in the fan and variable speed motor, the unit can be utilized for different materials and appropriate settings determined for the different grains to be threshed and separated.

With respect to the separation aspect, theoretically the air velocity in a column needed to suspend a particle is given by the formula:

$$V = 2g^2 M(\gamma p - \gamma)/C A \gamma p \gamma$$

where
A = projected area of particle, m²
$\gamma$ = fluid specific weight, N/m³
$\gamma p$ = particle specific weight, N/m³
C = particle aerodynamic drag coefficient, dimensionless
V = relative velocity, m/s
M = particle mass, kg Considering the foregoing, the velocity needed to suspend wheat is calculated as being 12.7 m/sec. but experiments have found the preferred velocity is in the range of 8.5–9 m/sec. In an actual device constructed, after experiments, a 5 cm diameter air column was chosen and it was found effective when utilizing the shortest length possible with standard P.V.C. or ABS couplings. 5 cm ABS 45° wye couplings were utilized with the column being oriented 45° from the vertical. It was found that the best air distribution occurred when the bottom Y was rotated 90° on the column with respect to the upper Y. With both branches being on the upper side, a large quantity of air exited through the threshing chamber instead of continuing up the column. Air flow rate was found to be 0.023 m³/sec. on the high speed and 0.017 m³/sec on the lower speed, i.e. respectively 5,000 and 3,000 rpm. air being directed from the fan to the column by way of a 5 cm diameter flexible hose.

In the foregoing, there is disclosed a preferred embodiment of the invention wherein the device includes a beater for threshing and a blower for separating the grain from the chaff. In a simplified version the blower can be omitted and only the beater used for threshing. Also, in place of the electric motor drive one could use a gear train and hand driven crank.

The device illustrated in FIGS. 1 and 2, and described in detail in the foregoing, preferably is located within a case illustrated by broken line 50 and which has a tray 51 removably mounted therein for collecting the clean grain. The plate 17 can be mounted on either the case or housing providing chamber 11. Furthermore plate 17 can be slidably mounted or pivotally mounted in any known convenient manner to permit selectively varying the size of the air inlet to the fan chamber 11. The case 50 can be provided with suitable handle means (not shown) to facilitate carrying and the motor wire connections, switches therefor and the like can also be mounted on the case.

An alternative to air column 20 illustrated in FIGS. 1 and 2 is shown in FIG. 3. Referring to FIG. 3 there is illustrated an air colum 20A. The column has an air inlet 24A, an air and chaff outlet 23A, a grain and chaff inlet 25A and a clean grain outlet 21A. When using air column 20A on the device illustrated in FIGS. 1 and 2 conduits 19 and 22 would be connected to respective inlets 24A and 25A. The arrangement in both columns is such that the clean grain falls by gravity to and through an outlet from the column and the lighter chaff is carried by air flowing through the column and discharged through another outlet from the column. The grain and chaff from the thresher portion is fed (by gravity) into the column through an inlet thereto located between the air inlet and chaff outlet.

The embodiments of the invention in which an exclusive property or privilege is claimed are defined as follows:

1. A portable hand carryable grain threshing device for use in obtaining samples of grain for test purposes, said device comprising:
   (a) a housing having a chamber therein;
   (b) a foraminous wall within said chamber and spaced from selected walls thereof separating said chamber into respective first and second areas;
   (c) a driven beater within said first area and an inlet for feeding heads of grain to the beater in such area;
   (d) an outlet from said second area;
   (e) an air flow passage means having first and second outlets spaced apart from one another axially therealong, one of said outlets being at a higher elevation than the other during use of the device;
   (f) passage means connecting the outlet from said second area to said air flow passage means at a position between the outlets therefrom; and
   (g) means to cause air flow through said air flow passage means in a direction from said lower one of said pair of outlets to the other of such outlets past said connecting passage means.

2. A portable hand carryable grain threshing device for use in obtaining samples of grain for test purposes, said device comprising:
   (a) first and second chambers separate from one another and each having an inlet thereto and an outlet therefrom;
   (b) a driven fan in one of said chambers and a driven beater in the other of said chambers;
   (c) conduit means having first and second outlets spaced apart from one another axially therealong and oriented such that during operation one of the outlets is at a higher elevation than the other; and (d) first and second passage means connecting the outlets of respective ones of said chambers to said conduit means at positions spaced apart from one another axially therealong.

3. A device as defined in claim 2 including a foraminous wall spaced a selected distance from said beater and disposed in the chamber having the beater therein.

4. A device as defined in claim 3 wherein said foraminous wall is cylindrical in form circumscribing said beater and extending across the chamber, said wall being spaced from a wall of the chamber extending circumferentially around the beater.

5. A device as defined in claim 4 wherein said beater comprises one or more prongs radiating outwardly from a shaft mounted for rotation and adapted to be driven by suitable means.

6. A device as defined in claim 5 wherein said drive means comprises an electric motor.

7. A device as defined in claim 6 wherein said motor has a double ended shaft, said fan being mounted on one end thereof and said beater being mounted on the other end thereof.

8. A device as defined in claim 4 including a further foraminous wall located in the cylindrical foraminous wall on the side of the beater remote from the inlet to such chamber and spaced from a side wall of the chamber remote from said inlet.

9. A device as defined in claim 8 wherein said inlet is substantially symmetrical about the axis of rotation of said beater.

10. A device as defined in claim 2 including means selectively to vary the rate of air flow through said conduit means.

11. A device as defined in claim 10 wherein said means comprises means selectively to vary the size of the inlet to the chamber having the fan therein.

12. A device as defined in claim 6 wherein said motor is a variable speed motor.

13. A portable hand carryable grain threshing device for use in obtaining samples of grain for test purposes, said device comprising:

(a) first and second chambers separate from one another and each having an inlet thereto and an outlet therefrom;

(b) fan means located in said first chamber and beater means located in said second chamber;

(c) drive means for driving the fan and beater respectively to cause air flow from the outlet of said first chamber and thresh heads of grain in said second chamber;

(d) first conduit means having first and second outlets therefrom spaced apart from one another axially along such conduit; and (e) further conduit means connecting the outlets from said first and second chambers to said first conduit means such that air flow from the fan through said first conduit means separates the chaff and kernels therein and received from said second chamber, said chaff and air exiting through the first outlet from said first conduit means and the kernels exiting from said second outlet, said second outlet being located at a lower elevation than said first outlet.

14. A portable hand carryable grain threshing device for use in obtaining samples of grain for test purposes, said device comprising:

(a) a housing having opposed, spaced apart side walls and a peripheral wall extending therearound with a partition dividing the housing into first and second chambers separate from one another, each of said chambers having an inlet thereto and an outlet therefrom;

(b) fan means located in said first chamber and a driven beater means located in said second chamber;

(c) drive means for driving the fan and beater respectively to cause air flow from the outlet of said first chamber and thresh heads of grain in said second chamber;

(d) a foraminous wall within said second chamber spaced from said peripheral wall separating such chamber into respective first and second areas;

(e) first conduit means having first and second outlets therefrom spaced apart from one another axially along such conduit with one outlet being at a higher elevation than the other during use of the device; and (f) further conduit means connecting respective ones of the outlets from said first and second chambers to said first conduit means such that air flow from the fan through said first conduit means separates the chaff and kernels therein and received from said second chamber, said chaff and air exiting through the first outlet from said first conduit means and the kernels exiting from said second outlet, said second outlet being located at a lower elevation than said first outlet.

* * * * *